Nov. 17, 1953   M. G. CARLSON   2,659,203
HYDRAULIC CONTROL SYSTEM FOR ARTICULATED
LOCOMOTIVES AND THE LIKE
Filed Dec. 30, 1949   2 Sheets-Sheet 1

INVENTOR.
Melvin G. Carlson
BY
Clarence F. Poole
ATTORNEY

Nov. 17, 1953 M. G. CARLSON 2,659,203
HYDRAULIC CONTROL SYSTEM FOR ARTICULATED
LOCOMOTIVES AND THE LIKE
Filed Dec. 30, 1949 2 Sheets-Sheet 2

INVENTOR.
Melvin G. Carlson
BY Clarence F. Poole
ATTORNEY

Patented Nov. 17, 1953

2,659,203

UNITED STATES PATENT OFFICE 2,659,203

HYDRAULIC CONTROL SYSTEM FOR ARTICULATED LOCOMOTIVES AND THE LIKE

Melvin G. Carlson, Chicago, Ill., assignor to Goodman Manufacturing Company, Chicago, Ill., a corporation of Illinois Application December 30, 1949, Serial No. 136,058

2 Claims. (Cl. 60—52)

This invention relates to hydraulic control systems, and is particularly concerned with an improved system adapted to control similar functions, such as braking, sanding, etc., on tandem connected vehicles, such as mine locomotives, which must be controlled from one or more stations on each locomotive.

The principal object of this invention is to provide a system which utilizes only one connecting hose coupling between the two locomotives for each function controlled. In this sense the invention may be considered as an improvement over that disclosed in Patent No. 2,463,325, issued March 1, 1949, to Joseph J. Slomer, which utilizes two hose connections for each function controlled.

Other objects and advantages will be apparent from the following description in connection with the drawings in which.

Figure 1:
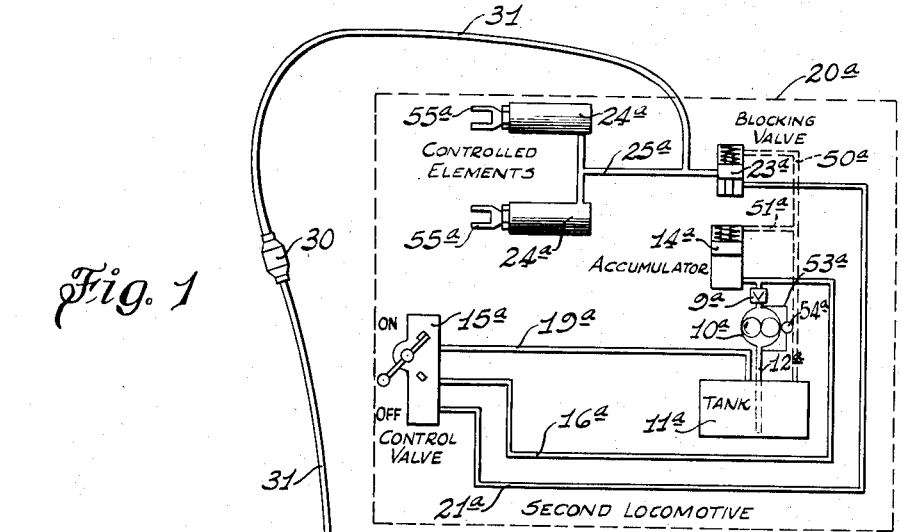
Fig. 1 shows a schematic representation of a fluid diagram for a hydraulic braking system for two locomotives connected to operate in tandem and illustrating one form in which my invention may be embodied.

Referring now more specifically to the drawings illustrating the improved hydraulic system, a separate system or circuit is provided for each locomotive so the locomotives may be operated separately when uncoupled. The control systems are of the same construction so only that for the "first locomotive," generally designated 20, will be described in detail, identical elements of the "second locomotive" system, generally designated 20a, being indicated by identical reference numerals followed by the letter "a." A fluid pump 10 is supplied with fluid from a storage tank 11 through a pipe 12. At the outlet of the pump backflow is prevented by a check valve 9. The pump 10 supplies fluid under pressure to an accumulator 14 of a well known form commonly used in hydraulic systems, which accumulates pressure to operate the brakes when power to the locomotive is turned off and the pump is not in operation. From the accumulator and from the pump, fluid under pressure is conducted to a brake control valve 15 through a pipe 16. This control valve may be of any well known form of variable pressure control valve for supplying pressure at increasing pressures as the control handle therefor is turned towards an "on" position, and is no part of the present invention so is not herein shown or described in detail. Upon releasing of the brakes by moving the handle to an "off" position, fluid is returned in the conventional manner from the braking means through the control valve to the tank 11 by means of a return pipe 19. A pipe 21 leads from the control valve 15 to a blocking valve 23 which is best shown enlarged in Figs. 1a and 2a. The blocking valve is connected by means of a pipe 25 to controlled elements which are herein shown as being two hydraulic brake operating cylinders 24, 24. Other controlled elements, such as sanding cylinders, may likewise be controlled by this novel system with the advantages above enumerated. Conduit means 31 having a coupling 30 is connected between the two locomotives to place the two sets of controlled elements 24 and 24a in communication with one another. This conduit means 31 may comprise but a single hose connection extending between the two locomotives to correlate the action of the two sets of controlled elements upon actuation of either one of the control valves 15, 15a, as will be described. The blocking valve 23 comprises a casing 32 having a bore 33 formed therewithin. For convenience in manufacture, drilled and tapped openings 34 and 36, closed by plugs 37 and 38 respectively, are utilized at the ends of the bore. Reciprocably fitted within the bore is a piston type closure member 39 adapted to automatically control passage of fluid between the inlet port 41 and the outlet port 42. Coil spring means 43 provided between the plug 37 and the piston 39 urge the latter to a normal position as shown in Fig. 1a, where it will close off the outlet port whereby fluid is blocked from passing from the pipe 25 to the pipe 21; at the same time, however, fluid under pressure will pass in the reverse direction simply by moving the piston aside against the compression of spring 43. Thus, pressure admitted to the pipe 21 by the control valve 15 will move the blocking valve piston to the abnormal position shown in Fig. 2a to admit fluid to the controlled elements 24 through pipe 25 and to the similar controlled elements 24a through the hose coupling 31.

Upon release of the pressure in pipe 21 by moving the handle of control valve 15 to off position, fluid will flow backward through pipes 25, hose 31, pipes 21 and 19, to the tank, under the urgence of spring retracting means (not shown) associated with both sets of controlled elements 24 and 24a. It is essential at this time, in order to fully release the brakes, that the piston 39 leave the outlet port 42 uncovered during the backflow; otherwise, some pressure will be trapped within the hose and brake circuit, leaving the brakes on to some extent and possible dragging. Retarding means is therefore provided to slow down the rate of return of the piston from abnormal to normal positions. In this case, the retardation is effected by making the piston act as a dashpot through use of a restricted aperture 46 in the breathing port 47. This port may be left open to atmosphere, if desired, but from a practical standpoint, to keep dust out of the bore 33 and to conserve fluid which may leak past the piston, a line 50 may be utilized as a return to tank. For a similar practical reason, a line 51 may be utilized to connect the spring end of the accumulator bore to tank.

Some form of pump recycle line 53 and overload relief valve 54 will usually be employed. It will be understood that the systems shown are illustrated with the bare essentials needed to disclose the invention, and that a commercial structure would be equipped with other accessories, such as pump motor controls and safety features of various kinds.

Figure 1A:
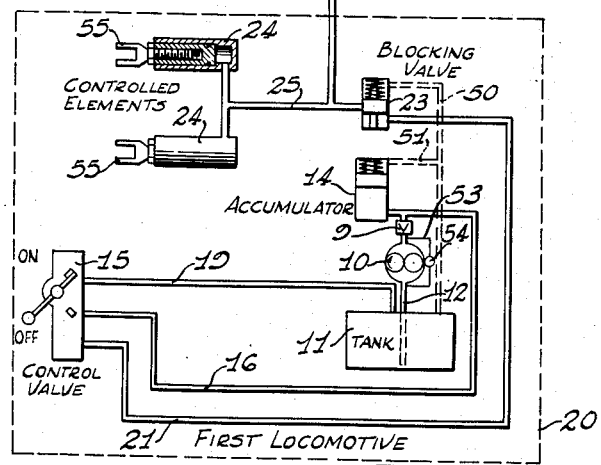
Fig. 1a is a sectional view of a blocking valve utilized in the Fig. 1 hydraulic system.
Figure 1A:
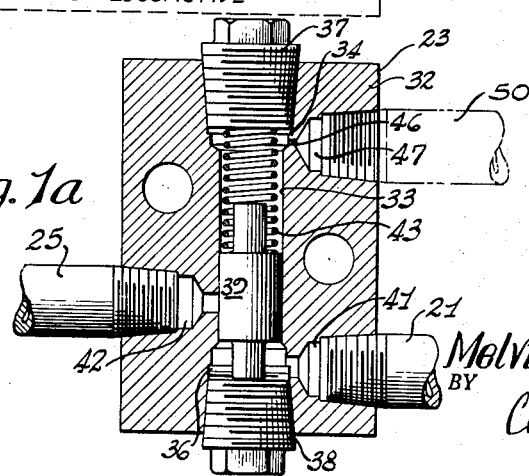

At rest the system will be as shown in Fig. 1. The pumps 10 and 10a may both be running continuously while the locomotives are in use, maintaining pressure in the accumulator and recycling all fluid through line 53. Another system which may be utilized is to have the pump normally inoperative, to be started responsive to movement of the control valve handle from the off position. Regardless of the type of pump control utilized, when the control valves are in off position, the blocking valves will be in their normal position and the controlled elements will be in their retracted positions, as shown in Fig. 1.

Figure 2:
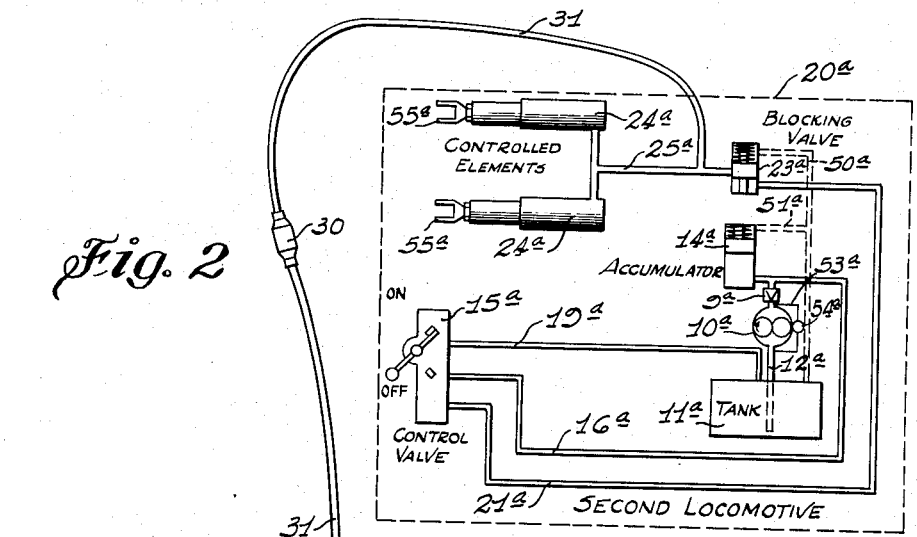
Fig. 2 is a fluid diagram similar to Fig. 1, showing both sets of controlled elements actuated in response to operation of one of the control valves.
Figure 2A:
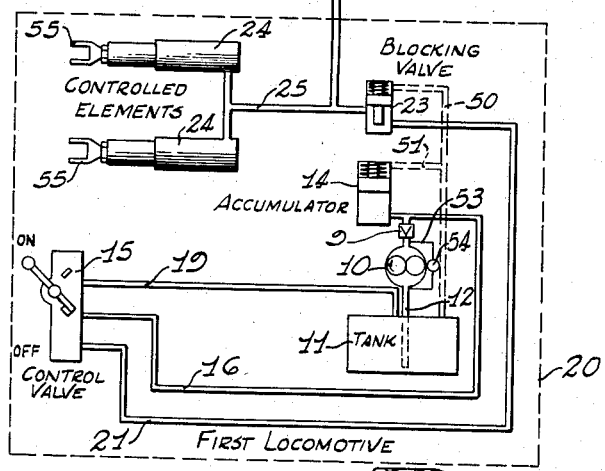
Fig. 2a is a view similar to Fig. 1a, showing the blocking valve in an abnormal position such as it would assume under the conditions shown in Fig. 2.
Figure 2A:
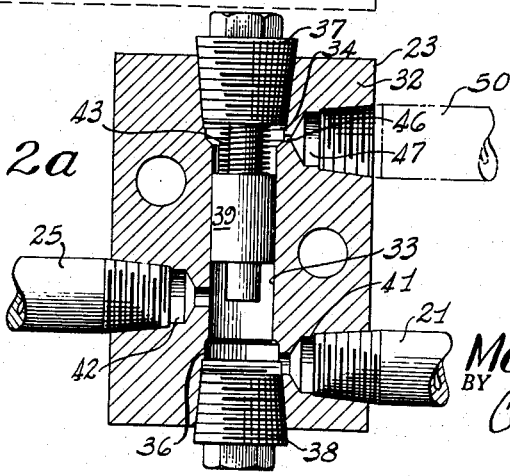

To actuate both sets of controlled elements 24 and 24a from control valve 15, as shown in Fig. 2a, the handle is moved to the degree of braking effort desired. Pressure will then be admitted from line 16 to line 21. This pressure will displace the blocking valve piston 39 to its abnormal position and pass on into line 25 to extend the brake links 55. The pressure will also be transmitted through the connecting hose 31 to line 25a of the second locomotive system, and will be blocked from entering the main part of that system by blocking valve 23a whose piston is in its normal position. The pressure thus will be diverted by blocking valve 23a to extend the links 55a of controlled elements 24a. The blocking valve 23a thus acts to prevent loss of fluid from the first locomotive circuit through the control valve 15a and into tank 11a of the second locomotive circuit.

To release the brakes, the handle of valve 15 is returned to its off position. This automatically provides communication between lines 19 and 21 through the valve. The pressure in line 21, therefore, drops as fluid flows backward into the tank 11 under the urgence of the spring means above-mentioned, which are utilized in both sets of controlled elements to retract the links 55 and 55a. The piston 39 will be moved downwardly towards its Fig. 1 position by the action of spring 43 but this movement will be retarded by the restricted flow orifice 46 to such a rate that the outlet port 42 will not be closed until the fluid used in braking has been withdrawn from the controlled elements through pipe 25 and hose 31. Without this novel arrangement and functioning of parts, the use of a single conduit 31 would eventually result in all the fluid from one of the locomotive systems being transferred to the storage tank of the other system. With this arrangement it is possible to use a single hose connection through which fluid flows in opposite directions at different times to perform the braking and releasing operations.

From the above description it will be apparent that operation of the controlled elements by means of control valve 15a will be identical to that described in connection with control valve 15. In such case the blocking valve 23 will function to prevent loss of the second locomotive fluid into the tank of the first locomotive system.

Thus, only one source of supply for fluid under pressure is used to operate the brakes on the two locomotives and this source of supply is the one directly connected with its associated control valve, and when the brakes are released, fluid is returned to this same source of supply from the brake cylinders of the two locomotives. This permits the other source of supply to be at full pressure ready to supply full pressure to the locomotive brakes when its control valve is operated to supply fluid under pressure to operate the brakes of the two locomotives.

It may further be seen that a commercially simple valve system has been provided between the two hydraulic systems for automatically reversing the direction of flow of fluid between the blocking valves, which is so arranged as to require but a single hose connection between the two locomotives. These hose connections are generally of quite heavy construction and often it is necessary to tie together as many as three different groups of functions, including braking and two sanding circuits, between tandem connected locomotives. Conventionally, it has been necessary to join the locomotives by six of these heavy hose connections.. With the present invention only three are required.

It should be noted that while the system has, for the sake of simplicity, been especially described only in connection with the specific braking function on locomotives, it also may be employed for other functions and on other devices besides locomotives.

Therefore, while a particular form of the present invention has been shown, it will be apparent that minor changes therein will readily suggest themselves to others skilled in the art without departing from the spirit and scope of the invention.

Having described the invention, what is claimed as new is:

1. In a pair of interconnected hydraulic systems for simultaneously controlling a pair of separate controlled elements from a control station associated with either system; each system including a pump connected to move fluid to one of said controlled elements and wherein said controlled element is operable by the application of increasing pressure from said pump; a control valve between the pump and controlled element; a single conduit interconnecting said systems and connected at each end between the controlled element and the pump of its associated system: the combination in said interconnected systems of a blocking valve located in each of said systems and connected between said single conduit and the control valve of its associated system, said blocking valve comprising a valve casing with a bore therein, and a piston slidable in said bore, said casing having ports therein communicating respectively with the corresponding control valve and controlled element and being arranged so that communication therebetween is blocked by said piston when the control valve of the other interconnected system is actuated, and means biasing said piston to the blocking position.

2. The invention as defined in claim 1 wherein means are provided for restricting the rate of movement of the blocking valve of the other system to prevent entrapment of pressure fluid in said controlled elements upon movement of said control valve to a position releasing pressure fluid from said controlled elements.

MELVIN G. CARLSON.

References Cited in the file of this patent

UNITED STATES PATENTS

| Number | Name | Date |
| --- | --- | --- |
| 262,829 | Proz | Aug. 15, 1882 |
| 1,543,552 | Coulson | June 23, 1925 |
| 1,712,089 | Miles | May 7, 1929 |
| 1,987,435 | Engel | Jan. 8, 1935 |
| 2,247,140 | Twyman | June 24, 1941 |
| 2,463,325 | Slomer | Mar. 1, 1949 |